(12) United States Patent
Hill et al.

(10) Patent No.: US 6,401,014 B1
(45) Date of Patent: Jun. 4, 2002

(54) SIGNAL SYSTEM

(76) Inventors: Jason Edward Hill, 74, Regent Farm Road, Gosforth, Newcastle Upon Tyne, Tyne and Wear, NE3 3HD (GB); John David Brown, 25, Peak View Drive, Ashbourne, Derbyshire, DE6 1BR (GB)

( * ) Notice: Subject to any disclaimer, the term of this patent is extended or adjusted under 35 U.S.C. 154(b) by 0 days.

(21) Appl. No.: 09/705,772

(22) Filed: Nov. 6, 2000

(30) Foreign Application Priority Data

Nov. 8, 1999 (GB) ............................................. 9926353

(51) Int. Cl.[7] ........................... G05B 9/03; G05B 15/02; G05D 1/00
(52) U.S. Cl. .............................. 701/3; 701/14; 340/901; 340/945; 340/982; 244/1 R
(58) Field of Search ................................ 701/3, 14, 36, 701/1; 244/1 R; 340/901, 945, 982

(56) References Cited

U.S. PATENT DOCUMENTS 5,778,207 A 7/1998 Simon

FOREIGN PATENT DOCUMENTS

EP 0 754 991 A 1/1997
EP 1102439 * 5/2001 ........... H04L/12/46

OTHER PUBLICATIONS

Derwent English abstract–May 23, 2001–Signaling system for aircraft, has nodes that are arranged into hierarchy of 3 levels, where each node in connected to higher node by signal transmission link for communication.*

* cited by examiner

Primary Examiner—William A. Cuchlinski, Jr.
Assistant Examiner—Olga Hernandez
(74) Attorney, Agent, or Firm—W. Warren Taltavull; Manelli Denison & Selter PLLC

(57) ABSTRACT

A signal system 10 for a vessel such as an aircraft, incorporates nodes 16A, B, C arranged in a hierarchy. Low level nodes 16C are associated with plant 14 of the aircraft. Mid-level nodes 16B can communicate with groups of low level nodes 16C, grouped by proximity. A top level node 16A can communicate with all mid-level nodes 16B.

Decision making capability is built into nodes 16, to allow decisions to be taken at the lowest hierarchical level at which all of the necessary information is available.

18 Claims, 1 Drawing Sheet

SIGNAL SYSTEM

TECHNICAL FIELD AND BACKGROUND OF THE INVENTION

The present invention relates to signal systems for transmitting signals within aircraft.

Many types of signal are required within an aircraft, during normal operation. For instance, control signals are required for instructing appropriate operation of plant of many kinds. Responses to control signals may be required, to allow for monitoring of correct operation, for instance. Diagnostic and fault finding or fault reporting signals may also be required. It is conventional in aircraft design to provide direct links between the source of any signal and its destination, often duplicated to provide redundancy for safety reasons. The provision of a direct link for each required signal route allows the format of signal to be optimised for that route, by choice of transmission technique, design and choice of technology for the transmission path, and the like. However, the result is a complex loom of wiring which incorporates many possible fault locations, adding significant mass to the aircraft and making fault finding difficult.

SUMMARY OF THE INVENTION

The present invention provides a signalling system for an aircraft which incorporates a plurality of items of plant, the system comprising a plurality of nodes arranged into a hierarchy of at least three levels, the nodes of each level above the lowest level being connected by signal transmission means to a plurality of nodes lower in the hierarchy.

Preferably each node at the lowest level is associated with an item of plant, for communication therewith. Nodes are preferably selected for connection to a higher level node by reference to their proximity to that higher level node. Preferably, at least those nodes above the lowest level include at least some decision-making capability, and are operable to transmit in response to a signal received from a lower level node. Each node with decision-making capability may be authorised to make decisions to a level set in accordance with the level of the node in the hierarchy, and to pass a signal to a higher node in the event that a decision above the authorised level is required. Each node is preferably operable to pass signals from a lower level node to which the node is connected, to another lower level node to which the node is connected, without requiring communication with a higher level node.

Preferably, signals passed between nodes include plant control signals, and/or signals indicating the status or performance of plant, and/or diagnostic signals, and/or signals indicating power requirements of plant.

Preferably at least one node is capable of responding to power requirement signals to produce control signals for power generators of the aircraft. Preferably at least one node is capable of recording diagnostic signals for subsequent analysis. Preferably at least one node is capable of responding to plant status or performance signals and to produce modified plant control signals in response thereto and to the required plant status and performance.

The signal transmission means may include a plurality of links between nodes and operating according to different transmission formats. The transmission formats may include electrical, and/or electromagnetic, and/or hydraulic, and/or pneumatic transmission formats. At least some nodes are preferably connected to links of different transmission formats and are provided with conversion means operable to provide conversion between formats.

Preferably at least one node is operable to control operation of a power delivery system of the aircraft. Items of plant are preferably grouped within the aircraft, the items of a group being provided with power by a distribution arrangement from a common point in the power delivery network of the aircraft, there being a node corresponding to the common point and connected with lower level nodes corresponding only with members of the group. Preferably the node corresponding with the common point is operable to control the operation of power distribution means which distribute power to the group members from the common point.

Preferably the signal transmission means includes at least one link which connects two nodes and provides a plurality of independent communication paths between the nodes.

BRIEF DESCRIPTION OF THE DRAWINGS

Examples of the present invention will now be described in more detail, by way of example only, and with reference to the accompanying drawings, in which.

DESCRIPTION OF THE PREFERRED EMBODIMENT AND BEST MODE

Figure 1:
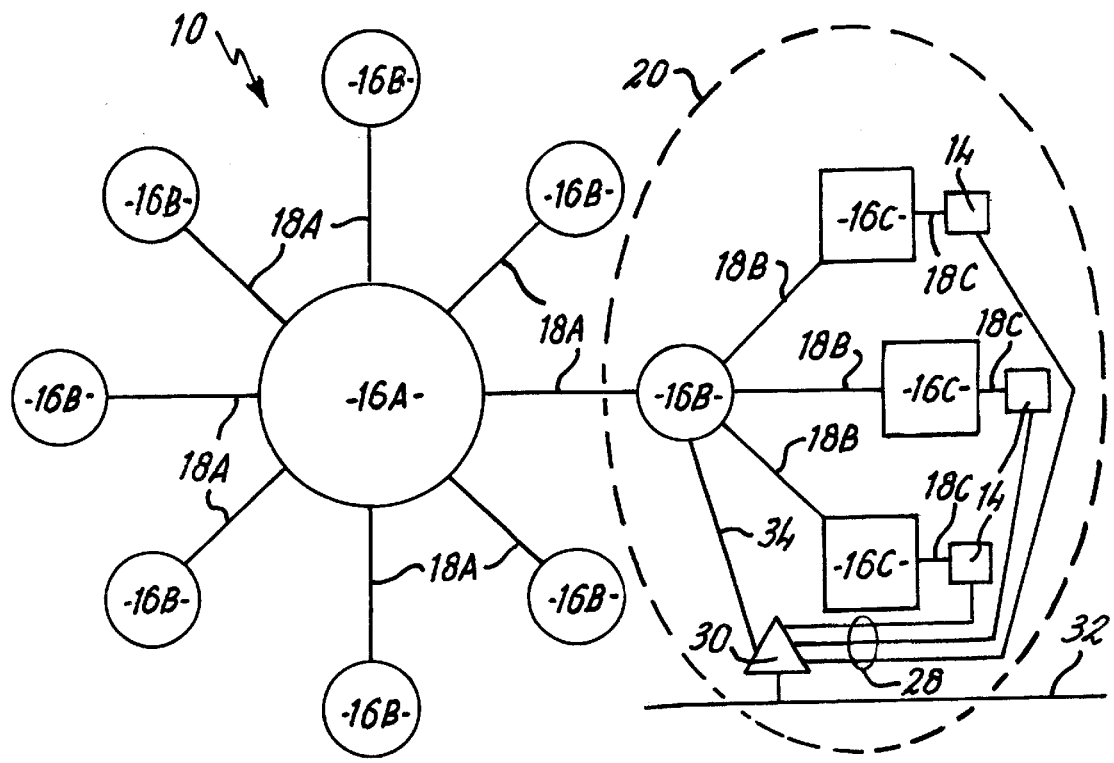
FIG. 1 is a highly schematic diagram, illustrating the hierarchy of a signal system according to the present invention.
Figure 2:
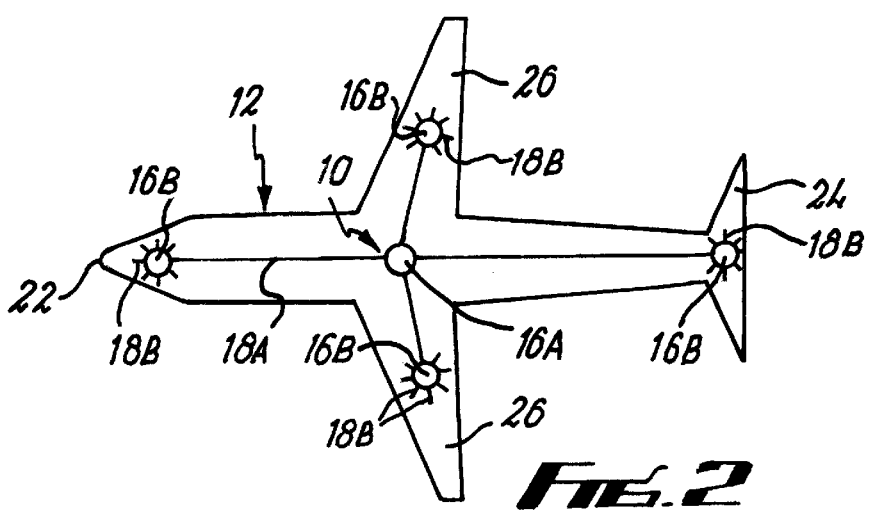
FIG. 2 illustrates, highly schematically, the manner of installation of a system of the type shown in FIG. 1, in an aircraft.

FIG. 1 illustrates a signal system 10 for an aircraft 12 (FIG. 2). The system 10 incorporates a plurality of items of plant 14 of many types, such as avionics systems, safety systems, cabin services (such as galleys, lighting, toilet equipment etc.) and the like. Other items of plant would include plant which receives signals, such as a display receiving information relating to the operation of the aircraft, or a control which creates signals to control the aircraft, such as a joystick.

The system 10 also includes a plurality of nodes 16A, B, C arranged into a hierarchy of at least three levels. In the accompanying drawings, the nodes of a common level of the hierarchy are all indicated by a common suffix letter. The nodes 16A, 16B of each level above the lowest level are connected by signal transmission links 18 to a plurality of nodes 16B, 16C lower in the hierarchy. Only one group of low level nodes 16C, connected to a single node 16B, is shown in FIG. 1, for simplicity.

The plant 14, as indicated above, all have some requirement to send and/or receive signals, such as plant which receive control signals in order to control their operation, or plant which create control signals for use in controlling other plant, or plant which display or otherwise respond to information provided by signals received from elsewhere within the aircraft.

Each plant 14 is connected to a node 16C at the lowest level of the hierarchy, by a dedicated link 18C. The link 18C may be implemented in any appropriate technology and use any appropriate transmission format. These choices may be made individually for each link 18C. Thus, it is envisaged that in an aircraft, there will be a mixture of links of an electrical or electromagnetic (radio or fibre optic) nature, or hydraulic or pneumatic nature, and making use of a variety of signal encoding techniques. Electrical and electromagnetic signals could, for instance, be transmitted by two-wire lines, twisted pairs, coaxial cables, optical fibres, radio waves, wave guides, or carrier wave injection onto power cables or buses.

The link 18C provides communication between the node 16C and the plant 14, to allow the node 16C to control the plant 14. The complexity of the control and of the signals passing between the node 16C and the plant 14 will depend on the nature of the plant 14. For instance, the plant 14 may be a simple switch or relay, requiring the node 16C simply to instruct the plant to be on or off. Alternatively, the plant 14 could be more complex, such as a pump, requiring the node 16C to instruct pump speed, pressures etc. Again, if the plant 14 was a display, the node 16C would be required to communicate the information to be displayed. In any of these or other alternatives, communication along the link 18C may be in only one direction, such as from the node 16C to control the state of the switch, or from plant such as a joystick, sending a signal representing the position of the joystick. Alternatively, signals could pass in both directions, such as a signal to control the plant 14, and a feedback signal to report the status of the plant 14, to allow monitoring.

The node 16C will preferably include some processing power in order to make decisions in the light of signals passing between the node 16C and the plant 14. For example, the node 16C may be providing a control signal to control the setting (speed, output voltage or the like) of the plant 14, and be receiving a feedback signal indicating the setting achieved, allowing the control signal to be modified to maintain the plant 14 stably at the status required. The provision of this decision making capability within the node 16C allows low level decision making to take place locally, without communication being necessary between the node 16C and any node higher in the hierarchy.

It is to be realised that the illustration in FIG. 1 is schematic. In particular, the node 16C could be integrated into the plant 14 to a greater or lesser extent, according to the complexity required of the node 16C, the processing power available at the node and within the plant, and the like.

Communication between each node 16C and the corresponding plant 14 can be chosen to be analogue, digital or a combination of the two, with data rates, protocols, transmission mediums (cables, fibre optics etc.) being chosen appropriately for the nature of the plant 14.

The nodes 16C and associated plant 14 are formed into notional groups, indicated by the broken line 20. A similar group 20 will be associated with each node 16B. Each group 20 includes a node 16B at the hierarchical level above the nodes 16C. The node 16B is connected to the nodes 16C of the group 20 by links 18B, by which the node 16B may communicate with each node 16C, for instance to report the current operating status or condition of plant 14, or to pass instructions to or from the plant 14.

The nodes 16B will incorporate some decision-making capability at a level higher than the capability of the nodes 16C. Thus, for instance, in the event that a joystick 14 reports a change in its position, representing a change in the required settings of avionics systems, this will be reported to the node 16B by the appropriate node 16C. The node 16B can then make a decision to pass a revised instruction to a node 16C within the same group 20, if the appropriate plant 14 is within the group 20.

If the destination plant 14 is not within the group 20, the node 16B must send an appropriate signal to the next higher level of the hierarchy. This is represented by the node 16A, which is the highest level in the illustrated example. The node 16A is connected to the node 16B of each group 20.

Thus a signal received from any group 20 can be passed on to any other group, as appropriate, i.e. the group containing the plant 14 for which the signal is intended.

Thus, it can be seen that a signal passing between two plant 14 need not propagate unnecessarily through the system 10, but need only propagate up the hierarchy to a point at which a node 16 can send the signal back down a different route through the hierarchy, to the intended destination plant 14.

The links 18B and 18A between nodes 16C, 16B and 16A can be individually chosen as regards their transmission format and implementation technology, and a different choice may be made for each link. However, in the event that a mixture of different types of link is provided, nodes 16 will need to incorporate conversion circuits in order that signals can be sent and received in the appropriate format for each link to which a particular node is connected.

An example of a control signal propagating through the system 10 can now be described, after briefly describing the schematic representation of an implementation shown in FIG. 2. FIG. 2 shows an aircraft 12 within which a top level node 16A is located, shown schematically as being central in the aircraft 12. Links 18A connect the node 16A to nodes 16B located in the vicinity of the cockpit 22, tail 24 and wings 26 of the aircraft 12. Links 18B fan out from each node 16B to connect the nodes 16B to the corresponding nodes 16C of the four groups 20, but the nodes 16C and the plant 14 to which the nodes 16C are connected, are not shown in FIG. 2, in the interests of clarity.

In order to describe a control signal propagating through the system 10, the situation may be considered in which the pilot moves the joystick in order to instruct a change in the settings of the avionics systems. This change will be detected by the joystick sensors, and reported to the node 16C associated with the joystick. If the result of the change requires a change in wing flap position, for example, this will be noted by the node 16C and reported to the node 16B. The node 16B will recognise that the plant which controls flap position is not within its group, and thus report to the node 16A that a change in flap position has been requested. The node 16A then dispatches instructions to the group or groups containing plant controlling the flap positions, where those signals will be received by the nodes 16B of the groups 20. They in turn will pass revised instructions to the nodes 16C controlling the flap position plant, which will cause that plant to change the flap position. This will cause changes in feedback signals to allow the flap position change to be monitored, and will cause status signals to begin to propagate through the system 10, to allow cockpit displays to be updated.

In this example, decision-making will be required in order to determine the required change in flap position corresponding with the change in joystick position. This decision-making can be provided in a number of ways. At one extreme, the node 16C which serves the joystick sensors could be used to make the decision, so that the signal propagating through the system will be representing the new position required. At another extreme, the new joystick position could be reported up the hierarchy, for instance to the top level node 16A, where decision-making can take place with the benefit of other information, such as engine conditions or the like.

The nodes of each level of the hierarchy have more information available than nodes of lower levels, and are therefore better able to make decisions. However, decision-making preferably takes place at the lowest hierarchy level at which the necessary information is available, in order to minimise the information flow through the system.

The above description has related to the hierarchical flow of control instructions and feedback information through the system 10. In addition to these functions, the system 10 provides control functions relating to power generation and delivery within the aircraft 12. In particular, it is desirable for the system 10 to be used for control of a power supply system of the type described in our co-pending application, entitled "Power Supply System for an Aircraft" and claiming priority from British Patent Application No. 9926354.3, filed on Nov. 8, 1999. In that power supply system, power generators provide power to a transmission system which transmits the power through the aircraft. Power distribution systems are provided at various locations around the aircraft, drawing power from the transmission system, for distribution to groups of power consumers, preferably grouped by their proximity. Part of this arrangement is shown simply and schematically in FIG. 1, which illustrates a distribution circuit 28 which incorporates a conversion circuit 30 drawing power from the transmission circuit 32 and converting this power, as necessary, to supply power in an appropriate format (electrical, hydraulic or pneumatic) for the plant 14. A link 34 is provided between the node 16B and the conversion circuit 30. This link 34 allows the node 16B to perform control and diagnostic functions in addition to the functions described above, as follows.

First, the node 16B makes use of information gathered from the nodes 16C and from additional sensors such as voltage and current sensors, if appropriate, to determine the power requirement of the group 20 and to monitor the power being received by the group 20. The node 16B can make decisions about adjusting the performance of the conversion circuit 30 in order to ensure that a stable power supply is maintained to the plant 14 within the corresponding group 20. Thus, the operating characteristics of the circuit 30 can be adjusted as demand increases or decreases. The decision-making capability of the node 16B allows some control of the power supply to the plant 14 to be taking place within the group 20.

In addition, the node 16B will report to the node 16A in relation to the power demand of the corresponding group 20 and in relation to the status of the power being provided to the group 20. This allows the node 16A to make calculations concerning the overall power requirement for the aircraft 12 and to issue appropriate instructions for control of power generators (engines and auxiliary power units) in order to ensure that the power available over the transmission circuit 32 remains matched with the power required by all of the plant 14 in the aircraft 12. However, lower level decisions concerning performance of individual circuits 30, for instance, take place locally, within the group.

The signal system 10 can also be used to collect diagnostic information, particularly diagnostic information for subsequent downloading from the aircraft, for consideration and analysis off-line. Diagnostic information concerning operating status, faults and the like can be recorded at each level of the hierarchy of nodes 16, and stored at that level until operational signal traffic on the system 10 is sufficiently low to allow the diagnostic information to be passed up to the next higher level node until reaching the highest node 16A, for collation and storage until retrieved for downloading.

Many variations and modifications can be made to the apparatus described above, without departing from the scope of the present invention. In particular, many different technologies can be used for signal transmission within the system 10. The number of levels of the hierarchy can be changed, but three is considered sufficient for many applications. Any one or more of the communication links within the system 10 may be provided by a plurality of independent parallel links, to introduce redundancy into the system for reliability and resistance to faults.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

What is claimed is:

1. A signaling system for an aircraft, said system incorporating a plurality of items of plant, said system comprising nodes arranged into a hierarchy of at least three levels, those of said nodes forming each level above the lowest level of said hierarchy being connected by signal transmission means to a plurality of those of said nodes forming a lower level in the hierarchy.

2. The system of claim 1, wherein each said node at the lowest level of said hierarchy is associated with a one of said items of plant, for communication therewith.

3. The system of claim 1, wherein each of said nodes is connected to a higher level node which is proximate to said node.

4. The system of claim 1, wherein at least those of said nodes above said lowest level include decision-making means, and are operable to transmit in response to a signal received from one of said nodes in a lower level of said hierarchy.

5. The system of claim 4, wherein each of said nodes with decision-making capability is operable to make decisions-to a level set in accordance with the level of said node in said hierarchy, and to pass a signal to a node in a higher level of said hierarchy in the event that a decision above the authorised level is required.

6. The system of claim 1, wherein each of said nodes is operable to pass signals from a node in a lower level of said hierarchy and to which the node is connected, to another node in said lower level and to which said signal-passing node is connected, without requiring communication with a node in a higher level of said hierarchy.

7. The system of claim 1, wherein signals passed between said nodes include plant control signals, any one or more of the set of signals comprising signals indicating the status of plant, signals indicating performance of plant, diagnostic signals, and signals indicating power requirements of plant.

8. The system of claim 1, wherein at least one of said nodes is operable to respond to power requirement signals to produce control signals, said control signals being for use in controlling power generators of the aircraft.

9. The system of claim 1, wherein at least one of said nodes is capable of recording diagnostic signals for subsequent analysis.

10. The system of claim 1, wherein at least one of said nodes is capable of responding to at least one of plant status and plant performance signals and to produce modified plant control signals in response thereto and in response to required plant status and performance.

11. The system of claim 1, wherein said signal transmission means include a plurality of links between said nodes and operable according to different transmission formats.

12. The system of claim 11, wherein said transmission formats include one or more of electrical, electromagnetic, hydraulic and pneumatic transmission formats.

13. The system of claim 11, wherein at least some of said nodes are connected to links, said links having different transmission formats, and said system further comprising conversion means operable to provide conversion between said formats.

14. The system of claim 1, wherein said signalling system comprises a power delivery system and at least one of said node is operable to control operation of said power delivery system.

15. The system of claim 14, wherein said items of plant are grouped within said aircraft, said items of each said group being provided with power by a corresponding distribution arrangement from a corresponding common point in said power delivery network of said aircraft, said system comprising a node corresponding to said common point and connected with nodes at a lower level of said hierarchy and corresponding only with members of said group.

16. The system of claim 15, wherein said node corresponding with said common point is operable to control operation of said power distribution means which distribute power to members of said group from said common point.

17. The system of claim 1, wherein said signal transmission means includes at least one link which connects two of said nodes and provides a plurality of independent communication paths between said nodes.

18. An aircraft incorporating a system according to claim 1.

* * * * *